United States Patent
Gu et al.

(10) Patent No.: US 11,030,575 B2
(45) Date of Patent: Jun. 8, 2021

(54) SMART ITEM MONITORING SYSTEM

(71) Applicants: Steve Gu, San Jose, CA (US); Stuart Kyle Neubarth, Mountain View, LA (US); Ying Zheng, Santa Clara, CA (US); Brian Bates, New Orleans, LA (US)

(72) Inventors: Steve Gu, San Jose, CA (US); Stuart Kyle Neubarth, Mountain View, LA (US); Ying Zheng, Santa Clara, CA (US); Brian Bates, New Orleans, LA (US)

( * ) Notice: Subject to any disclaimer, the term of this patent is extended or adjusted under 35 U.S.C. 154(b) by 0 days.

(21) Appl. No.: 16/510,981

(22) Filed: Jul. 15, 2019

(65) Prior Publication Data

US 2021/0019693 A1    Jan. 21, 2021

(51) Int. Cl.
| | |
|---|---|
| *G06Q 10/08* | (2012.01) |
| *A47F 13/00* | (2006.01) |
| *A47F 5/08* | (2006.01) |
| *G06T 7/292* | (2017.01) |
| *H04N 5/232* | (2006.01) |
| *H04N 5/247* | (2006.01) |
| *G01P 13/00* | (2006.01) |
| *G01G 19/14* | (2006.01) |
| *G01G 19/52* | (2006.01) |

(52) U.S. Cl.
CPC ......... *G06Q 10/087* (2013.01); *A47F 5/0823* (2013.01); *A47F 13/00* (2013.01); *G01G 19/14* (2013.01); *G01G 19/52* (2013.01); *G01P 13/00* (2013.01); *G06T 7/292* (2017.01); *H04N 5/232* (2013.01); *H04N 5/247* (2013.01); *G06T 2207/10016* (2013.01); *G06T 2207/30196* (2013.01); *G06T 2207/30232* (2013.01)

(58) Field of Classification Search
CPC ..... G06Q 10/087; A47F 13/00; A47F 5/0823; H04N 5/232; H04N 5/247; G01G 19/14; G01G 19/52; G01P 13/00; G06T 2207/30196; G06T 2207/10016; G06T 2207/30232; G06T 7/292

See application file for complete search history.

(56) References Cited

U.S. PATENT DOCUMENTS

| | | | | |
|---|---|---|---|---|
| 8,626,613 | B2* | 1/2014 | Dale | A47F 5/0869 705/28 |
| 9,740,977 | B1* | 8/2017 | Moon | G06K 9/00771 |
| 10,315,897 | B2* | 6/2019 | High | G05D 1/021 |
| 2012/0228240 | A1* | 9/2012 | Gentile | A47F 5/0823 211/1 |
| 2012/0245969 | A1* | 9/2012 | Campbell | G06Q 10/087 705/7.11 |
| 2018/0336513 | A1* | 11/2018 | Smith | G05B 19/406 |
| 2019/0019140 | A1* | 1/2019 | Costello | A47F 1/126 |

* cited by examiner

*Primary Examiner* — Bobbak Safaipour
(74) *Attorney, Agent, or Firm* — Jun Liu

(57) ABSTRACT

The present invention describes a system for monitoring items coupled with support utilities. The system is configured to detect motions caused by customer actions and optimize the camera system and computing resources of a remote server. The system also is configured to sense items that are removed, added or misplaced automatically.

5 Claims, 5 Drawing Sheets receiving information of total weight of the one or more items assigned to at least one peg board hook of the peg system 405 obtaining data from a set of sensors associated with the peg system, wherein the obtained sensor data comprises weight data for the set of items on the at least one peg board hook 410 analyzing the obtained sensor data, including the weight data, using a predetermined weight of an assigned item associated with the at least one peg board hook 415 determining a status of the at least one peg board hook by using analysis results, wherein the determined status comprising a number of items in the set of items or an indication of a misplaced item 420

Alerting by blinking of a LED light when any items of the set of items assigned to the at least one peg board hook are removed or added from the at least one peg board hook 425

SMART ITEM MONITORING SYSTEM

BACKGROUND OF THE INVENTION

This application relates to systems, methods, devices, and other techniques for monitoring items coupled with support utilities. The system is configured to detect motions caused by customer actions and optimize the camera system and computing resources of a remote server. The system is configured to sense items that are removed, added or misplaced automatically.

Retail stores frequently display products on pegs for easy accessibility by customers. A peg may be attached to a wall, a shelf, a stand, or any other surface. Typically, one or more products or items are hung from the peg. A peg sometimes includes a label or other signage indicating the name or type of items hanging on the peg and/or a price. Customers frequently remove an item from a peg and then re-hang the item on the wrong peg. This may result in a peg having too many items hanging on it. This also results in items hanging on a peg associated with a label or other signage which does not correspond to the items hanging on the peg.

Therefore, it is desirable to have systems and methods to detect motions caused by customer actions and optimize the camera system and computing resources of a remote server. Also it is beneficial to have the system sense items that are removed, added or misplaced automatically.

SUMMARY OF THE INVENTION

This application relates to systems, methods, devices, and other techniques for monitoring items coupled with support utilities. The system is configured to detect motions caused by customer actions and optimize the camera system and computing resources of a remote server. The system is configured to sense items that are removed, added or misplaced automatically.

The invention may describe a system for autonomously monitoring items. The system comprises a peg board. The system also comprises at least one hook of a set of hooks coupled with the peg board, wherein one or more items are assigned to the at least one hook. The system also comprises a sensing unit coupled with the peg board or with the at least one hook, wherein the sensing unit contains, at least one motion detecting sensor and at least one communication device coupled to the motion detecting sensor, wherein the motion detecting sensor is configured to detect motion of the at least one hook, wherein the motion detecting sensor is configured to pass information of the motion detected to the remote server via the at least one communication device. The system may also includes the following features: a set of cameras coupled to the remote server, wherein the set of cameras is configured to have a field of view of the set of hooks, wherein the set of cameras is used to track location information of a set of shoppers, wherein the location information is sent to the remote server via the communication device, wherein computer algorithm on the remote server is configured to determine the closest shopper among the set of shoppers to the at least one hook where the motion was detected, wherein the computer algorithm is configured to identify the closest shopper as interacting with the at least one hook. The system may also include this feature: the motion detecting sensor is configured to detect weight change. The system may also include this feature: the sensing unit is configured to identify whether any item is removed, replaced or misplaced based on the weight change detected by the motion detecting sensor. The system may also include these features: a set of cameras coupled to the remote server, wherein the set of cameras is configured to have a field of view of the set of hooks, wherein the set of cameras is used to take video information of the set of hooks and the one or more items, wherein computer algorithm on the remote server is configured to identify removed, replaced or misplaced items based on weight change detected by the motion detecting sensor and the video information from a set of cameras coupled to the remote server.

The invention may describe a method for autonomously monitoring items associated with a peg system. The method comprises these steps: receiving information of total weight of the one or more items assigned to at least one peg board hook of the peg system; obtaining data from a set of sensors associated with the peg system, wherein the obtained sensor data comprises weight data for the set of items on the at least one peg board hook; analyzing the obtained sensor data, including the weight data, using a predetermined weight of an assigned item associated with the at least one peg board hook; determining a status of the at least one peg board hook by using analysis results, wherein the determined status comprising a number of items in the set of items or an indication of a misplaced item.

In some embodiments, the peg hook can be replaced by a basket that can contain items for sale.

In some embodiments, the peg hook can be replaced by a platform that can contain items for sale.

In some embodiments, the peg hook can be replaced by a shelf that can contain items for sale.

In some embodiments, the peg hook can be replaced by a dispenser, such as a box with a hole in it where items can be pulled out one-by-one.

In some embodiments, the peg hook can be replaced by a slanted shelf.

In some embodiments, the peg hook can be replaced by a fridge.

In some embodiments, the peg hook can be replaced by any support means that can contain items for sale.

In some embodiments, the sensing unit is configured to detect the total weight on a peg hook for inventory management. In some embodiments, the system is configured to detect an empty peg, a full peg, and the number of items on a peg hook this way using the weight sensing technology. In some embodiments, the system is configured to detect an empty peg hook thus for re-stocking or full peg by combining the total weight sensor signal and a camera view of the peg hook using artificial intelligence computer program of the remote server on the video data stream from any of the camera system. The combination of video and weight sensor can give a high reliability status of items on the peg hook.

In some embodiments, artificial intelligence computer program of the system would use the information of identification of the shopper and his/her location tracked from sensors and cameras of the system and decide the identification of the shopper and items that he or she removed/added that coupled to the peg by certain decision algorithm.

In some embodiments, artificial intelligence computer program of the system would use the tracking information of shopper's hands from sensors and cameras of the system and decide the identification of the shopper and items that he or she removed/added that coupled to the peg by certain decision algorithm.

In some embodiments, artificial intelligence computer program of the system would use the information of motion detecting sensors and decide the identification of the shopper and items that he or she removed/added that coupled to the peg by certain decision algorithm.

In some embodiments, artificial intelligence computer program of the system would use the information of weight change sensors to identify items on the peg and decide items that a shopper removed/added that coupled to the peg by certain decision algorithm.

In some embodiments, artificial intelligence computer program of the system would use the image or video information of the peg hook to identify items on the peg and decide items that a shopper removed/added that coupled to the peg by certain decision algorithm.

In some embodiments, artificial intelligence computer program of the system would use one or any several of the above information/method in combination to decide the identification of the shopper and items that he or she removed/added that coupled to the peg by certain decision algorithm.

These and other aspects, their implementations and other features are described in details in the drawings, the description and the claims.

BRIEF DESCRIPTION OF THE DRAWINGS

FIG. 4 shows a method of autonomously monitoring items.

DETAILED DESCRIPTION OF THE INVENTION

Figure 1:
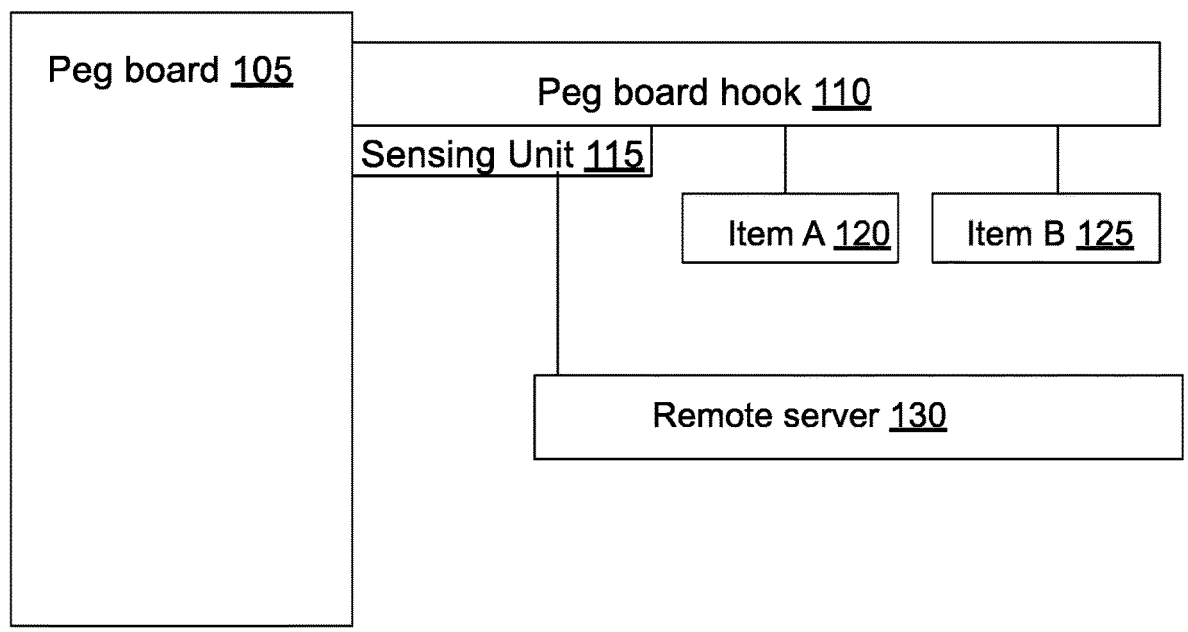
FIG. 1 shows an example diagram of a system for autonomously monitoring items.

FIG. 1 shows an example diagram of a system 100 for autonomously monitoring items.

In some implementations, the system 100 comprises a peg board 105. In some embodiments, a peg board can be represented as a board having a regular pattern of small holes for pegs, used chiefly for display of items or products. In some embodiments, a peg board is an essential component for providing a means to provide items for sale.

In some embodiments, the system comprises a peg hook 110. In some embodiments, a peg hook can be any shape of hook that items or products can be attached to. In some embodiments, a peg hook is attached physically to the peg board 105. In some embodiments, multiple peg hooks are attached to the peg board 105. In some embodiments, various computer chips, various sensors, different circuitry and other components may attach to the peg hook 110.

In some embodiments, the sensing unit 115 is coupled to the peg board hook 110. In some embodiments, the sensing unit comprises different sensors, such as motion detecting sensors, force sensors, load sensors, weight sensors, light sensors and other sensors. In some embodiments, the sensing unit comprises processors. In some embodiments, the sensing unit comprises communication units. In some embodiments, the communication units are wireless communication units. In some embodiments, the communications units are wired communication units. In some embodiments, sensing unit 115 is coupled to the remote server 130 by the communication unit or units.

In some embodiments, item A 120 is coupled to the peg board hook 110. In some embodiments, item B 125 is coupled to the peg board hook 110. In some embodiments, other items are coupled to the peg board hook 110.

In some embodiments, there are other peg boards hooks similar to peg board hook 110 are coupled to the peg board 105.

In some embodiments, the system may also includes the following features: a set of cameras coupled to the remote server, wherein the set of cameras is configured to have a field of view of the set of hooks, wherein the set of cameras is used to track location information of a set of shoppers, wherein the location information is sent to the remote server 130 via the communication device, wherein computer algorithm on the remote server 130 is configured to determine the closest shopper among the set of shoppers to the at least one hook where the motion was detected, wherein the computer algorithm is configured to identify the closest shopper as interacting with the at least one hook. The system may also include this feature: the motion detecting sensor is configured to detect weight change. The system may also include this feature: the sensing unit is configured to identify whether any item is removed, replaced or misplaced based on the weight change detected by the motion detecting sensor. The system may also include these features: a set of cameras coupled to the motion detecting sensor, wherein the set of cameras is configured to have a field of view of the set of hooks, wherein the set of cameras is used to take video information of the set of hooks and the one or more items, wherein computer algorithm on the remote server 130 is configured to identify removed, replaced or misplaced items based on weight change detected by the motion detecting sensor and the video information from a set of cameras coupled to the remote server 130.

Figure 2:
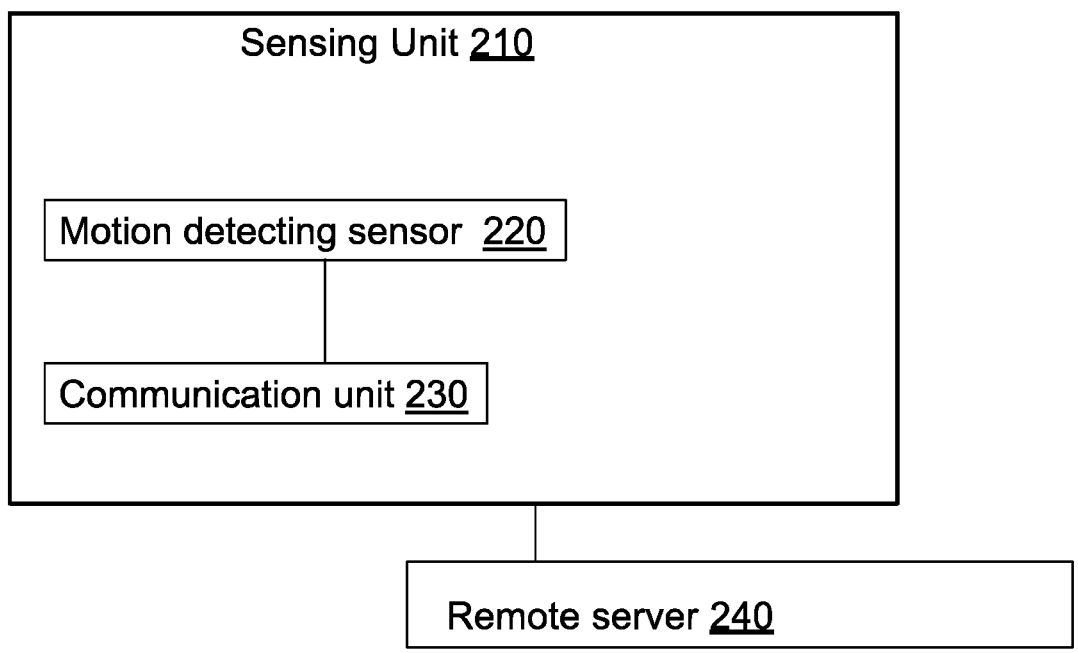
FIG. 2 shows an example diagram of sensing unit and remote server.

FIG. 2 shows an example diagram of sensing unit 210 and remote server 240. In some embodiments, a sensing unit 210 comprises motion detecting sensor 220. In some embodiments, the sensing unit 210 may comprises weight sensor, light sensor, force sensor, load sensor or other sensors.

In some embodiments, the sensing unit 210 also comprises communication unit 230. In some embodiments, multiple communication units may be included. In some embodiments, communication unit 230 could be wireless. In some embodiments, communication unit 230 could be wired. Sensing unit 210 is configured to communicate with remote server 240 by communication unit 230 or multiple communication units.

Figure 3:
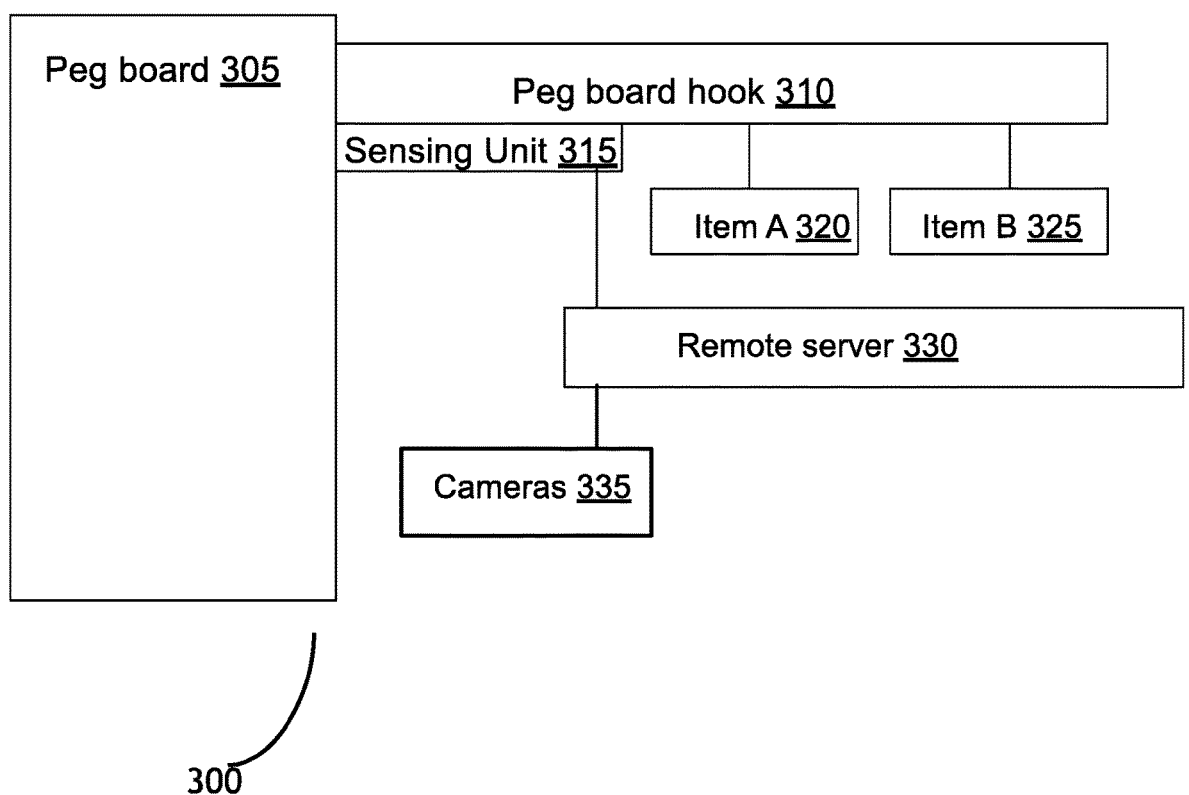
FIG. 3 shows another example diagram of a system for autonomously monitoring items.

FIG. 3 shows another example diagram of a system for autonomously monitoring items.

In some implementations, the system 300 comprises a peg board 305. In some embodiments, a peg board 305 can be represented as a board having a regular pattern of small holes for pegs, used chiefly for display of items or products. In some embodiments, a peg board 305 is an essential component for providing a means to provide items for sale.

In some embodiments, the system comprises a peg hook 310. In some embodiments, a peg hook 310 can be any shape of hook that items or products can be attached to. In some embodiments, a peg hook 310 is attached physically to the peg board 305. In some embodiments, multiple peg hooks are attached to the peg board 305. In some embodiments, various computer chips, various sensors, different circuitry and other components may attach to the peg hook 310.

In some embodiments, the sensing unit 315 is coupled to the peg board hook 310. In some embodiments, the sensing unit 335 comprises different sensors, such as motion detecting sensors, force sensors, load sensors, weight sensors, light sensors and other sensors. In some embodiments, the sensing unit 315 comprises processors. In some embodiments, the sensing unit 315 comprises communication units. In some embodiments, the communication units are wireless communication units. In some embodiments, the communications units are wired communication units. In some embodiments, sensing unit 315 is coupled to the remote server 330 by the communication unit or units.

In some embodiments, item A 320 is coupled to the peg board hook 310. In some embodiments, item B 325 is coupled to the peg board hook 310. In some embodiments, other items are coupled to the peg board hook 310.

In some embodiments, there are other peg board hooks similar to peg board hook 310 are coupled to the peg board 305.

In some embodiments, a set of cameras 335 is coupled to remote server 330 and can communicate with remote server 330. In some embodiments, cameras 335 receive instructions from remote server 330. In some embodiments, cameras 335 are configured to have views over items A 320. In some embodiments, cameras 335 are configured to have views over items B 325. In some embodiments, cameras 335 are configured to have views over other items coupled to peg board hook 310. In some embodiments, cameras 335 are configured to have views over other set of items coupled to any other peg board that is coupled to the peg board 305.

In some embodiments, a system 300 for autonomously monitoring items. The system 300 comprises a peg board 305. The system also comprises at least one hook 310 of a set of hooks coupled with the peg board 305, wherein one or more items are assigned to the at least one hook 310. The system 300 also comprises a sensing unit 315 coupled with the peg board 305 or with the at least one hook, wherein the sensing unit 315 contains, at least one motion detecting sensor and at least one communication device coupled to the motion detecting sensor, wherein the motion detecting sensor is configured to detect motion of the at least one hook 310, wherein the motion detecting sensor is configured to pass information of the motion detected to the remote server 320 via the at least one communication device. The system may also includes the following features: a set of cameras 335 coupled to the remote server, wherein the set of cameras 335 is configured to have a field of view of the set of hooks, wherein the set of cameras 335 is used to track location information of a set of shoppers, wherein the location information is sent to the remote server 330 via the communication device, wherein computer algorithm on the remote server 330 is configured to determine the closest shopper among the set of shoppers to the at least one hook where the motion was detected, wherein the computer algorithm is configured to identify the closest shopper as interacting with the at least one hook. The system 300 may also include this feature: the motion detecting sensor is configured to detect weight change. The system 300 may also include this feature: the sensing unit 315 is configured to identify whether any item is removed, replaced or misplaced based on the weight change detected by the motion detecting sensor. The system may also include these features: a set of camera 335 is coupled to the remote server, wherein the set of cameras is configured to have a field of view of the set of hooks, wherein the set of cameras 335 is used to take video information of the set of hooks and the one or more items, wherein computer algorithm on the remote server 330 is configured to identify removed, replaced or misplaced items based on weight change detected by the motion detecting sensor and the video information from a set of cameras coupled to the remote server 330.

FIG. 4 shows a method of autonomously monitoring items.

In some embodiments, the method comprises a step 405 of receiving information of total weight of the one or more items assigned to at least one peg board hook of the peg system.

In some embodiments, the method comprises a step 410 of obtaining data from a set of sensors associated with the peg system, wherein the obtained sensor data comprises weight data for the set of items on the at least one peg board hook.

In some embodiments, the method comprises a step 415 of analyzing the obtained sensor data, including the weight data, using a predetermined weight of an assigned item associated with the at least one peg board hook.

In some embodiments, the method comprises a step 420 of determining a status of the at least one peg board hook by using analysis results, wherein the determined status comprising a number of items in the set of items or an indication of a misplaced item.

In some embodiments, the method comprises a step 425 of alerting by blinking of a LED light when any items of the set of items assigned to the at least one peg board hook are removed or added from the at least one peg board hook.

Figure 5:
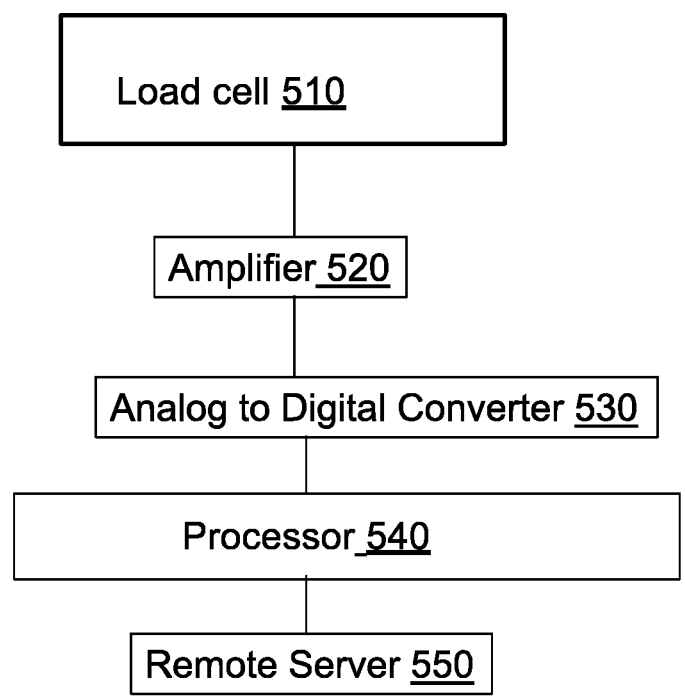
FIG. 5 shows an example diagram of motion sensing function

FIG. 5 shows an example diagram of motion sensing function.

In some embodiments, an example diagram to describe function of motion detecting sensor 220 could be following: a load cell 510 passes load signal to the amplifier 520 that could amplify the load signal. Then the load signal will be passed to Analog to Digital converter 530 for transfer the load signal (usually analog signal) to digital signal. The digital signal then could be passed to process 540 for process and then pass to the remote server 550.

The invention claimed is:

1. A system for autonomously monitoring items, the system comprising;
   a peg board;
   at least one hook of a set of hooks coupled with the peg board, wherein one or more items are assigned to the at least one hook;
   a sensing unit coupled with the peg board or with the at least one hook, wherein the sensing unit contains, at least one motion detecting sensor and at least one communication device coupled to the motion detective sensor, wherein the motion detecting sensor is configured to detect motion of the at least one hook, wherein the motion detecting sensor is configured to pass information of the motion detected to the remote server via the at least one communication device; and
   a set of cameras coupled to the remote server, wherein the set of cameras is configured to have a field of view of the set of hooks, wherein the set of cameras is used to track location information of a set of shoppers, wherein the location information is sent to the remote server via the communication device, wherein computer algorithm on the remote server is configured to determine the closest shopper among the set of shoppers to the at least one hook where the motion was detected, wherein the computer algorithm is configured to identify the closest shopper as interacting with the at least one hook.

2. The system for autonomously monitoring items of claim 1, wherein the motion detecting sensor is configured to detect weight change.

3. The system for autonomously monitoring items of claim 2, wherein the sensing unit is configured to identify whether any item is removed, replaced or misplaced based on the weight change detected by the motion detecting sensor.

4. The system for autonomously monitoring items of claim 3, further comprising :

a set of cameras coupled to the motion detecting sensor, wherein the set of cameras is configured to have a field of view of the set of hooks, wherein the set of cameras is used to take video information of the set of hooks and the one or more items, wherein computer algorithm on the remote server is configured to identify removed, replaced or misplaced items based on weight change detected by the motion detecting sensor and the video information from a set of cameras coupled to the remote server.

5. A method for autonomously monitoring items associated with a peg system, the method comprising:

receiving information of total weight of the one or more items assigned to at least one peg board hook of the peg system;

obtaining data from a set of sensors associated with the peg system, wherein the obtained sensor data comprises weight data for the set of items on the at least one peg board hook;

analyzing the obtained sensor data, including the weight data, using a predetermined weight of an assigned item associated with the at least one peg board hook;

determining a status of the at least one peg board hook by using analysis results, wherein the determined status comprising a number of items in the set of items or an indication of a misplaced item;

determining the closest shopper among a set of shoppers to the at least one hook where a motion is detected; and identifying the closest shopper as interacting with the at least one hook.

* * * * *